US011678296B1

(12) United States Patent
Luterman

(10) Patent No.: US 11,678,296 B1
(45) Date of Patent: Jun. 13, 2023

(54) SYSTEMS AND METHODS FOR CONTROLLING NODES OF A WIRELESS NETWORK IN RESPONSE TO SENSED EVENTS

(71) Applicant: Synapse Wireless, Inc., Huntsville, AL (US)

(72) Inventor: Greg Luterman, Madison, AL (US)

(73) Assignee: Synapse Wireless, Inc., Huntsville, AL (US)

( * ) Notice: Subject to any disclaimer, the term of this patent is extended or adjusted under 35 U.S.C. 154(b) by 7 days.

(21) Appl. No.: 17/355,106

(22) Filed: Jun. 22, 2021

(51) Int. Cl.
| | |
|---|---|
| *H04W 68/00* | (2009.01) |
| *H04W 76/11* | (2018.01) |
| *H04W 88/18* | (2009.01) |
| *H04W 88/16* | (2009.01) |

(52) U.S. Cl.
CPC .......... *H04W 68/005* (2013.01); *H04W 76/11* (2018.02); *H04W 88/16* (2013.01); *H04W 88/184* (2013.01)

(58) Field of Classification Search
CPC ... H04W 68/005; H04W 76/11; H04W 88/16; H04W 88/184
USPC ........ 370/312, 328, 329, 338, 341, 345, 350
See application file for complete search history.

(56) References Cited

U.S. PATENT DOCUMENTS

| | | | |
|---|---|---|---|
| 7,970,871 B2 | 6/2011 | Ewing et al. | |
| 8,885,513 B2 | 11/2014 | Ewing | |
| 9,374,874 B1 | 6/2016 | Ewing | |
| 9,619,989 B1 | 4/2017 | Ewing et al. | |
| 10,680,899 B1 | 6/2020 | Ibarra | |
| 10,813,001 B1 | 10/2020 | Ibarra | |
| 2008/0263614 A1* | 10/2008 | Xu ......................... | H04H 60/07 725/118 |
| 2012/0243457 A1* | 9/2012 | Narasimhan .......... | H04L 12/185 370/312 |
| 2014/0003322 A1* | 1/2014 | Grinshpun ............ | H04W 36/30 370/312 |
| 2016/0323841 A1* | 11/2016 | Davis ..................... | H04L 45/72 |

* cited by examiner

*Primary Examiner* — Nghi H Ly
(74) *Attorney, Agent, or Firm* — Butler Snow LLP; Jon E. Holland

(57) ABSTRACT

A backend network controller, such as a gateway, pushes "hint" instructions to nodes with instructions on planned reactions to asynchronous events so that the nodes are capable of reacting to hinted events before being instructed by the network controller to do so. Thereafter, when a sensor node senses and reports an event to the network controller or otherwise, one or more nodes having received a hint corresponding to the event may recognize the occurrence of the event in response to the reporting message and then react to the event before receiving a command from the network controller to do so. Thus, the nodes are capable of reacting to events faster than would otherwise be possible relying only on commands from the network controller.

12 Claims, 5 Drawing Sheets

SYSTEMS AND METHODS FOR CONTROLLING NODES OF A WIRELESS NETWORK IN RESPONSE TO SENSED EVENTS

BACKGROUND

Internet-of-things (IoT) devices, such as sensors or lighting systems, may be configured to function as nodes of a wireless mesh network, capable of receiving data from and transmitting data to other network devices. In a lighting system, nodes of a wireless mesh network often function as lighting controllers for controlling (e.g., diming or turning on/off) lights distributed through a building or other area.

In a common implementation of lighting controllers in a wireless system, a gateway functions as a central controller (a network management device) that can communicate with other devices on a mesh network by sending out a multicast message with the network's unique network identifier and allowing the message to propagate through the network, being processed only by nodes configured to recognize and process messages with that network identifier. Any delays in communication to or from the site controller can result in undesirable performance lags in lighting control. This reduces network efficiency and may increase needed network resources. Such delays may be due for example, to the site controller being busy or temporarily uncommunicative or non-responsive, radio frequency (RF) channel availability or high network traffic leading to packet collision. Where communication with the site controller is delayed, a significant lag may exist between an event (such as activation of a light switch or detection of an occupant) and a corresponding light control function (such as turning on a light).

Improved techniques to ensure timely operation of a lighting network are therefore generally desired.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

Figure 1A:
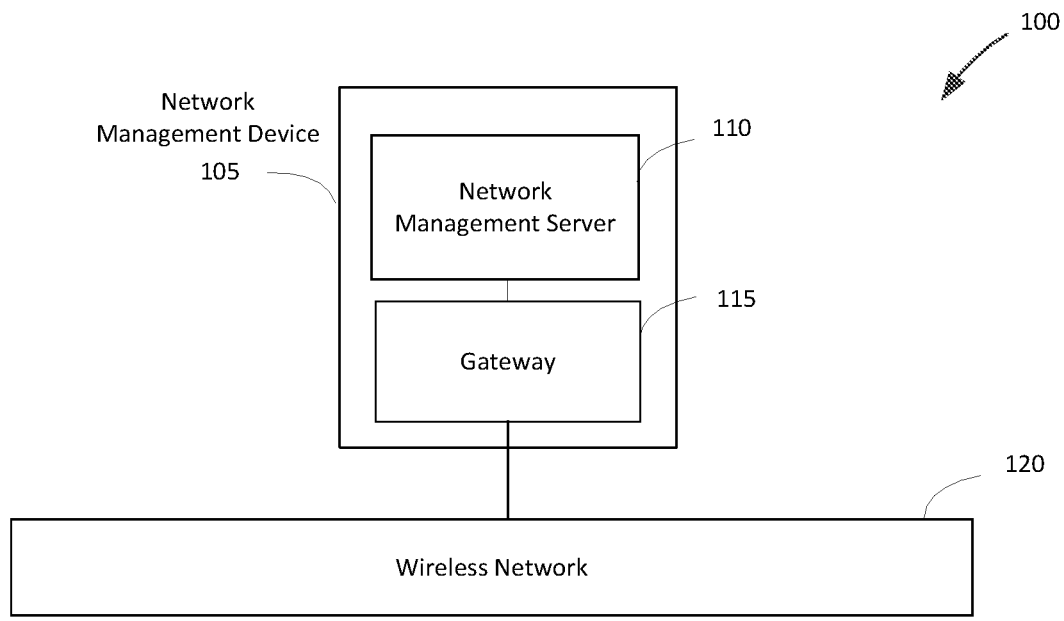
FIG. 1A is a block diagram of an exemplary embodiment of a network control system in accordance with the present disclosure.

In the figures, the left-most digit(s) of a reference number identifies the figure in which the reference number first appears. The use of the same reference numbers in different figures indicates similar or identical items or features. Moreover, multiple instances of the same part are designated by a common prefix separated from the instance number by a dash. The drawings are not to scale.

DETAILED DESCRIPTION

The present disclosure generally pertains to control systems and methods for wireless network management, specifically efficient distribution of messages through wireless mesh networks. For example, the disclosure is directed to an improved implementation where a gateway device sends "hint" messages to network nodes. In an exemplary embodiment, these hint messages contain information indicating how, based on the current state of the mesh network, the node should control its connected device, such as a light or sensor. In an exemplary embodiment, the wireless mesh network is a network of light sources controlled by respective lighting controllers. The lighting control is centralized at a site controller, such as a gateway. The hints sent by the gateway indicate how lighting should be controlled in response to different possible events, that is, a series of rules of instructions as to how the lighting control should react. Upon the subsequent receipt of a message by the lighting controller indicating that an event has occurred, the lighting controller takes the appropriate directed action. In an exemplary embodiment, this hint system is performed in parallel with and redundant to normal procedural action within the lighting network. That is, the lighting controller is instructed to act both the rule-based hint message received in advance, and from a temporal instruction from the gateway at the time an event has occurred, such instruction being passed through the network through multicast messaging.

In one embodiment, the hint message is sent from the gateway to a first lighting controller A indicating that if a light switch is activated, the lighting controller A should transition its light to a specified power level. At a later time, when the light switch is activated, a sensor node (e.g., a switch or a motion detector) that detects the activation may transmit a multicast message indicative of the event. This multicast message is transmitted to the gateway, which then updates the operational state of the network and sends an instruction to lighting controller A to transition the light to the specified power level. However, if the multicast message from the sensor node to the gateway is transmitted via lighting controller A, lighting controller A upon receiving the multicast message, in accordance with the hint system, recognizes the event indicated by the multicast message and reacts to transition the light to the specified power level. This reaction is taken even before the gateway receives the multicast message from the sensor. In an exemplary embodiment, if the lighting controller A later receives a duplicative command from the gateway, no additional reaction must be taken. Therefore, the state of the light is updated faster and with greater reliability in case of unreliable network communication.

In conventional solutions, the intelligence of a wireless mesh network is centralized at a gateway, such that all decision making must pass through the gateway prior to the issuance of instructions. Where a sensor receives an input, it sends the input to the gateway, which in turn transmits a command to a node. The transmission time of these multiple transmissions and the potential risk of dropped/resent packets leads to inefficiencies, as there may be a delay introduced between the sensing (e.g., pressing a switch) and the resultant action (e.g., turning on a light). Further, in an implementation where a network has a dense configuration of many nodes (such that any node has several neighbors) or the network is otherwise very large, network communication may not scale efficiently or make take additional time. Transmission delays may be compounded where there is simultaneous network activity, for example where a gateway is handling another task (such as pushing out an update, collecting topological or health data, or other performing network management functions). These delays may lead to inefficiencies, and in the case of industrial lighting, potential safety issues.

Alternately, conventional solutions may be decentralized or fully-distributed, such that every node is independently intelligent but no gateway exists. In such a case, a sensor sends instructions direct to a desired node. However, in such solutions without a gateway or site controller, network management and mapping becomes difficult. In addition, the amount of computational power that must be exerted by the individual nodes (sensors, lights, and so on) may be prohibitively compute-expensive or power-intensive for wireless devices and/or significantly increase the costs of the nodes. The added compute at the node may also slow decision making, such that nodes may be slow to act or react. Accordingly, in such a conventional solution, operational efficiency at the nodes of the wireless mesh network is compromised.

However, by virtue of the systems and methods described herein, proactive command instructions can be sent in the form of "hints", allowing the nodes to reach on their own prior to receiving explicit instructions from the network gateway. In this manner, lights in a lighting system may be quickly controlled in a desired configuration and/or schedule, even if the gateway is too busy to timely send commands or there is latency or traffic on the network. Put another way, the solutions described herein introduce intelligence to the nodes in addition to the gateway, so that additional messages that are asynchronous to normal network function may be sent to optimize system performance. Accordingly, reaction time to an event is faster, particularly in the case the gateway device is busy or if communication is unstable or unavailable. If a gateway is busy or offline, in contrast to conventional solutions, the systems and methods described herein provide a higher chance that a networked node will react to a stimulus in a desired manner. Where duplication of effort may negatively impact network performance (e.g., by adding traffic), the hint messages can be temporarily disabled, as such messages are not system critical in themselves. Therefore, the solutions described herein allow for the robust management of networks in different manners given different temporal network needs.

Further, since control decisions are made by the site controller, the circuitry and operation of the lighting controllers do not need to be complex, unlike a distributed system where there is no site controller. In addition, control commands for synchronous events, such as scheduled or automated activation/deactivation of lighting groups, may be pushed from the site controller without the use of hints, in parallel with execution of the hint system.

FIG. 1A depicts an exemplary embodiment of a network control system 100 comprising a network management server 110 coupled to a gateway 115 (also referred to herein as a site controller). In an exemplary embodiment, network management server 110 and gateway 115 are different logical components in network management device 105. However, in alternate embodiments, network management server 110 and gateway 115 may be discrete network devices connected via a wireless or wired connection. In yet another alternate embodiment, the functionalities of network management server 110 and gateway 115 are all performed by a single logical component of the network management device 105. In exemplary embodiments, the functionalities of the systems and methods described herein with reference to FIGS. 1B and 2-5 are performed at and by the gateway 115. To that end, solely for ease of discussion regarding the described embodiments, the term gateway 115 (or site controller) may be used herein. However, in other embodiments, all or a subset of the functionality and/or components described herein as being performed by or belonging to gateway 115 may be implemented in another component of network management device 105, whether local to or remote from gateway 115.

In some embodiments, if the network management server 110 is at a remote location, the gateway 115 may receive messages from the wireless network 120 and encapsulate such messages in accordance with TCP/IP or other protocol for transmission of the messages to the network management server 110 through a WAN, LAN, or other type of network. Messages from the wireless network 120 to be transmitted to other destinations may be similarly encapsulated or otherwise converted into a different protocol as may be desired. In the opposite direction, the gateway 115 may de-encapsulate messages received from a WAN or other type of network to remove overhead for routing messages through the wireless network 120. In the present disclosure, for ease of discussion, the term "gateway" is disclosed as managing a "network", however it is understood that the gateway may instead manage topology and command control for only a portion of a network, or a subnetwork containing only a subset of devices of the entire wireless network. Additionally, while the term "gateway" is used, it will be understood that such term can refer to any device that joins two networks (or subnetworks) so as to allow communication therebetween, even if the device performs other additional functions. The gateway is understood to refer to either hardware or a combination of hardware and software.

For illustrative purposes, it can be assumed that any of the components of system 100 are capable of wireless communication with any device or component connected thereto (either directly or indirectly) by the depicted lines. However, it will be noted that in addition to, or as an alternative to, wireless communication, any or all of the components of the system 100 may be coupled to another component through a physical medium.

Figure 1B:
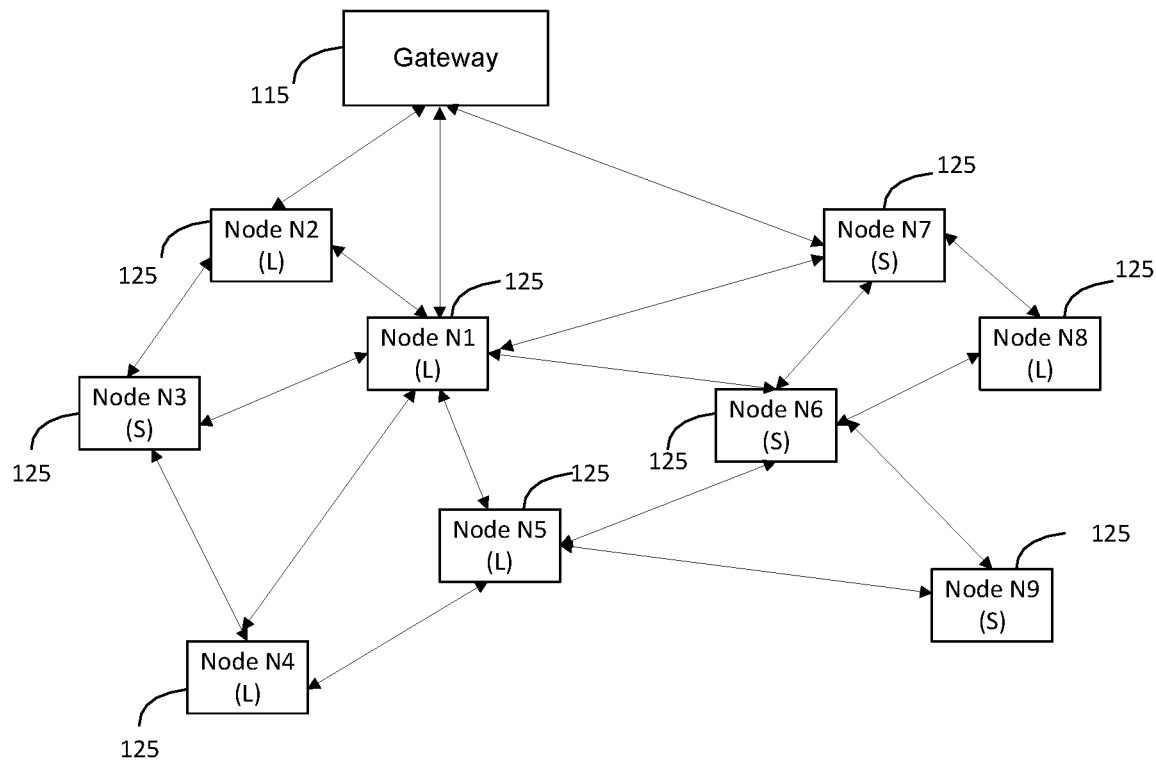
FIG. 1B is a block diagram of an exemplary embodiment of a wireless mesh network in accordance with some embodiments of the present disclosure.

In the embodiment of FIG. 1B, the wireless network 120 may be a network of devices, each represented as a node 125 (referred to collectively as nodes 125). Nodes 125 function to implement an ad hoc mesh network. Each respective node 125 can be stationary (fixed in place) or can be mobile, such that it can be moved to a different physical location. In some embodiments, this network may be topologically variable, as mobile nodes may move to a different location, additional nodes may be added, or nodes may be removed or become inaccessible. Different types of wireless or, alternatively, wired networks (or combinations thereof) are possible in other embodiments. In one exemplary embodiment, the nodes 125 communicate among one another wirelessly, but it is possible for any of the nodes 125 to communicate with any of the other nodes 125 over a conductive or optical medium. In other embodiments (not specifically shown), use of a gateway may be unnecessary and network management device 105 may instead have a communication device, such as an RF radio, that permits the network management server 110 to communicate directly with the wireless network 120 in accordance with the protocol used by the wireless network 120.

In the illustrated embodiment, nodes N1, N2, N4, N5, and N8 are labelled with the identifier (L), indicating that the labelled node is a lighting controller. While the term "lighting controller" or "lighting node" is used herein, the systems described herein are not limited to lighting systems and in other embodiments, this category of nodes may include any "reactive" node, meaning a node that would potentially take one or more actions in response to the recognition of an event on the network. Nodes N3, N6, N7, and N9 are labelled with the identifier (S), indicating that the labelled node is a sensor node. While the term "sensor" is used herein, this category of nodes may include any type of sensor, detector, or transducer capable of recognizing an event of function in the environment or on the network, such as a switch, a photocell, any sensor, such as an image sensor, a temperature sensor, a proximity or position sensor, a motion sensor, an occupancy/vacancy sensor, a particle or air quality sensor, a humidity sensor, a photoelectric sensor, or any other such component. The foregoing list is merely exemplary and it may be understood that any sensing device capable of network communication may act as a node 125. In addition, it is possible for any node 125 to operate as both a lighting controller and a sensor node by being configured to control at least one light source and to receive at least one input from a sensor.

Figure 2:
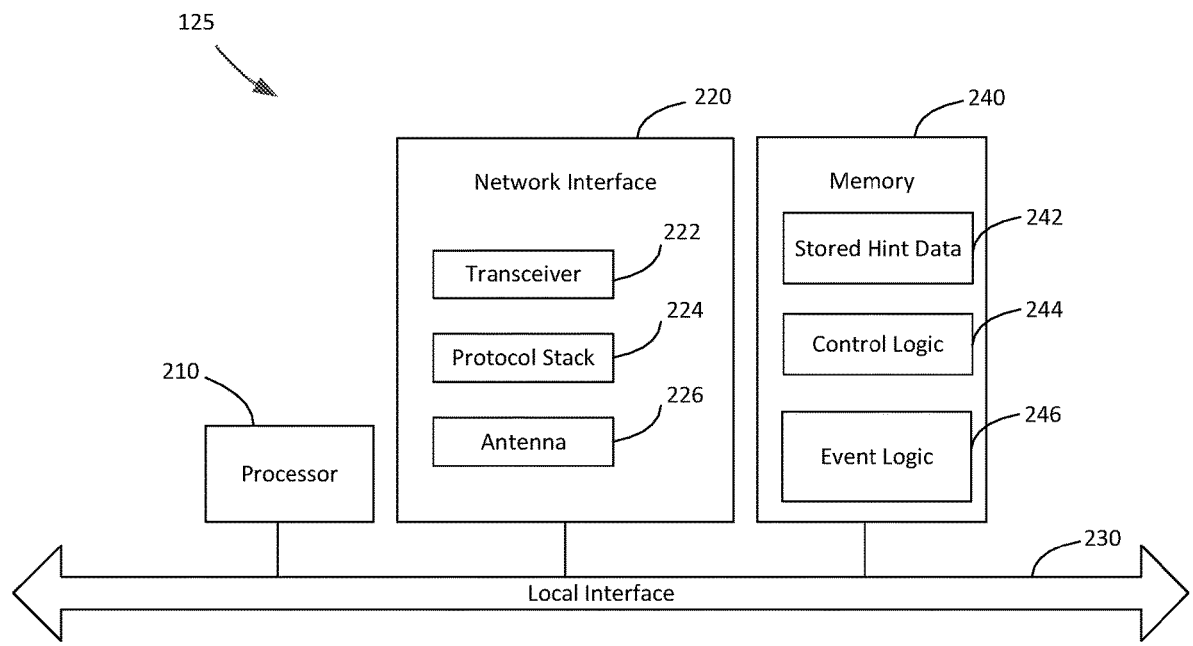
FIG. 2 is a block diagram of an exemplary embodiment of a network node, such as is depicted by FIG. 1.

FIG. 2 is a schematic diagram of components of a node 125 in accordance with an exemplary embodiment of the present disclosure. The exemplary node 125 comprises at least one processor 210, such as a central processing unit (CPU), digital signal processor, other specialized processor or combination of processors, or other circuitry that communicates to and drives the other elements within node 125 via a local interface 230 (for example, a communication bus). The node 125 has control logic 244 for generally controlling the operation of the node 125 and event logic 246 for recognizing and reacting to an event based on information in a multicast message and information stored in the memory 240 as stored hint data 242. The control logic 244 and/or event logic 246 can be implemented in software, hardware, firmware, or any combination thereof. In the embodiment illustrated in FIG. 2, the control logic 244 and/or event logic 246 are implemented in software and are stored in a memory 240. Control logic 244 and/or event logic 246, when implemented in software, can also be stored on any computer-readable medium, for example electronic, magnetic, or optical mediums, among others, or another system, apparatus, or device. The control logic 244 and/or event logic 246 can be executed by processor 210, which comprises processing hardware (e.g., one or more processors) for executing instructions stored in the memory 240, or any other circuitry capable of executing the instructions of the control logic 244 and/or event logic 246.

As used herein, memory 240 may refer to any suitable storage medium, either volatile and non-volatile (e.g., RAM, ROM, EPROM, EEPROM, SRAM, flash memory, disks or optical storage, magnetic storage, or any other tangible or non-transitory medium), that stores information that is accessible by a processor. In an exemplary embodiment, memory 240 comprises RAM on which the hint data 242 is stored. In such an embodiment, in the case of a power cycle or failure, the hint data may be lost. This is acceptable and it is done for the sake of storage efficiency, as the hint mechanism (as described further herein) is redundant of other later-sent command data sent from the gateway to the node and may be lost with minimal harm to overall network function. However, other embodiments may store hint data in permanent or non-volatile memory.

The node 125 also has a network interface 220 for enabling communication with other nodes over the network 120 and with the gateway 115. In an exemplary embodiment, the interface 220 is configured to communicate wirelessly over one or more geographic areas, but the interface 220 may alternately or additionally exchange data via a physical medium. As shown in FIG. 2, the network interface 220 has one or more of each of an antenna 226, a transceiver 222, and a protocol stack 224. The stack 224 controls the communication of data between the network interface 220 and the other networked nodes. In the exemplary node 125, the stack 224 is implemented in software, however, it may also be implemented in hardware, software, firmware, or any combination thereof. When implemented in software, the stack 224 may be stored in the node's memory 240 or other computer-readable medium. In one exemplary embodiment, each component shown by FIG. 2 (or a subset thereof) resides on and is integrated with a printed circuit board (PCB) (not shown). However, in other embodiments, other arrangements of the node 125 are possible.

Figure 5:
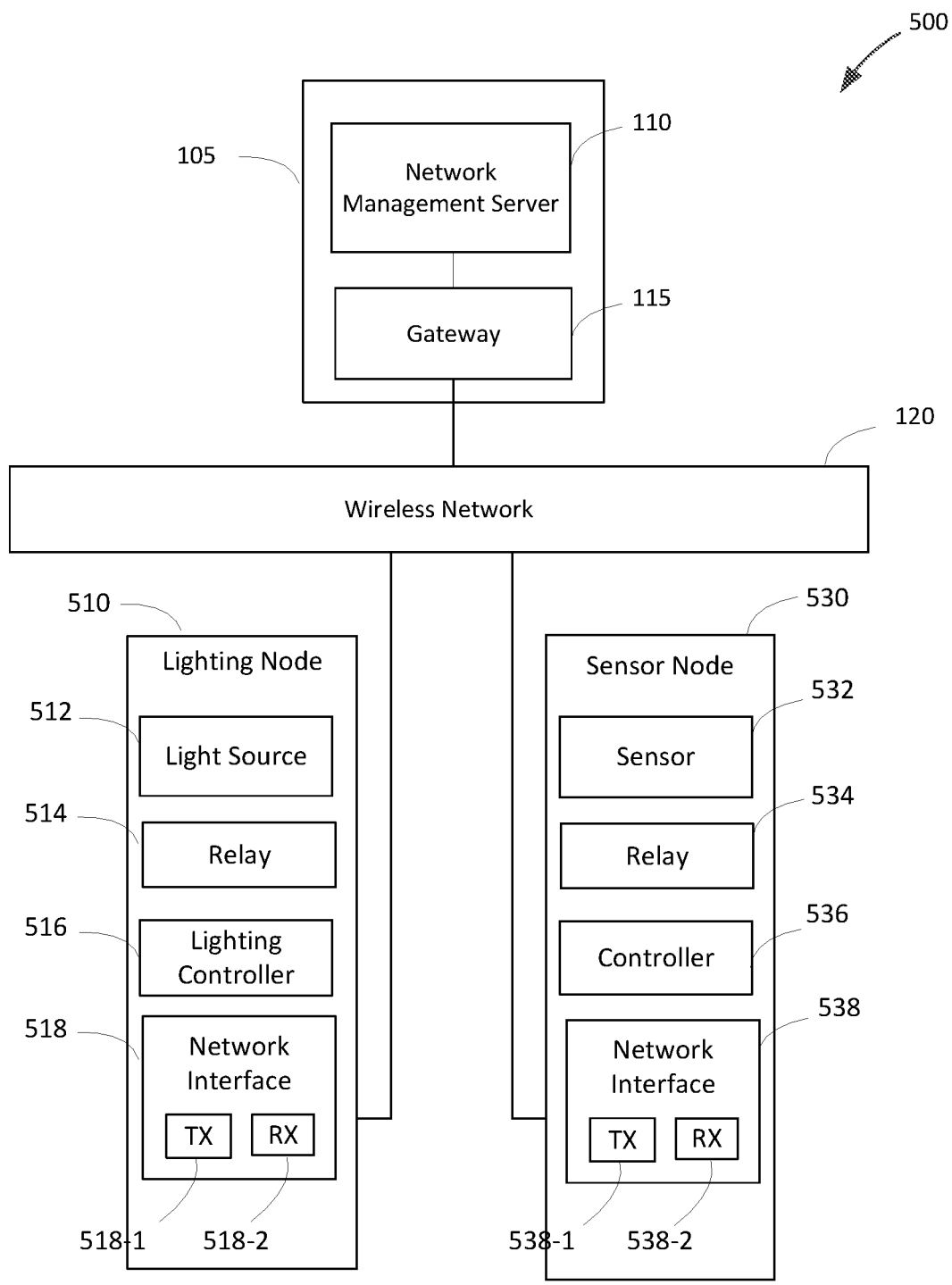
FIG. 5 is a block diagram of an exemplary embodiment of a lighting system in accordance with some embodiments of the present disclosure.

FIG. 5 illustrates an embodiment where the network control system is a lighting system 500, and gateway 115 connects the network management server 110 to one or more lighting nodes 510 via wireless network 120 (a mesh network). While FIG. 5 illustrates one lighting node 510 and one sensor node 530, it will be generally understood that the number and layout of the lighting nodes and sensor nodes in the lighting system 500 depends on the particular needs of the facility in which they are installed, and that, in different embodiments, any appropriate number of lighting nodes and/or sensor nodes may be used.

In one exemplary embodiment, an exemplary lighting node 510 may comprise a light source 512 such as a light emitting diode (LED) (or if appropriate, a laser diode, a fluorescent lamp, an incandescent light, or other light source) mounted in a lighting fixture, a lighting controller 516 for controlling the light source 512, a relay 514 configured to regulate the supply of electrical current to the light source 512 based on control signals from the lighting controller 516, and a network interface 518 for communicating via wireless (e.g., RF) signals. Network interface 518 may comprise a transmitter (TX) 518-1 for transmitting a wireless signal and a receiver (RX) 518-2 for receiving a wireless signal. In FIG. 5, only one light source 512 and one lighting controller 516 are shown in each lighting node 510 for illustrative purposes, but in other embodiments, any number of light sources 512 and any number of lighting controllers 516 may be utilized in each lighting node 510, and/or multiple light sources may be controlled by a single lighting controller 516. Lighting controller 516 can exercise various controls, including, for example, turning the light source 512 on and off, dimming the brightness of the light source 512, or, in a preferred embodiment, determining when to collect and/or transmit multicast messages and/or recognize events and information specified in hint messages or other control messages received from the gateway 115 via network interface 518. In an exemplary embodiment, each lighting node 510 is stationary (fixed in place) after installation. However, alternate embodiments may exist such that a light source may be moveable within a given area (e.g., to oscillate or illuminate different areas) or may be moveable to a different physical location.

An exemplary sensor node 530 may comprise one or more sensors 532 measuring any relevant environmental value(s) within the sensor's range. For example, sensor(s) 532 may be one or more of any type of sensor, detector, or transducer capable of recognizing an event of function in the environment or on the network, such as a switch, a photocell, any sensor, such as an image sensor, a temperature sensor, a proximity or position sensor, a motion sensor, an occupancy/vacancy sensor, a particle or air quality sensor, a humidity sensor, a photoelectric sensor, or any other such component. The sensor node 530 may also include a controller 536 for controlling the sensor 532 (e.g., turning it on/off), a relay 534 configured to regulate the supply of electrical current to the sensor 532 based on control signals from the controller 536, and a network interface 538 for communicating via wireless (e.g., RF) signals comprising a transmitter (TX) 538-1 for transmitting a wireless signal and a receiver (RX) 538-2 for receiving a wireless signal.

In some embodiments, each of (or a subset of) network interfaces 518 and 538 may use wireless (e.g., via radio frequency (RF)) communication to transmit/receive data to and from other nodes, other devices (e.g., assets or tags) on the network, and/or the gateway 115. In other embodiments, these devices could alternately communicate with infrared or ultrasound technology, or any other appropriate type of wireless communication. Further, each node may include one more memories (not specifically shown). These memories may comprise any suitable storage medium, either volatile and non-volatile (e.g., RAM, ROM, EPROM, EEPROM, SRAM, flash memory, disks or optical storage, magnetic storage, or any other tangible or non-transitory medium), that stores information that is accessible by a processor. The nodes may also include one or more processor(s) (not specifically shown, such as one or more central processing units (CPU), digital signal processors, other specialized processors or combination of processors, application-specific integrated circuits (ASICs), field-programmable gate arrays (FPGAs), microprocessors programmed with software or firmware, and/or any other circuitry that communicates to and drives the other elements within the node.

With reference to FIGS. 1A and 1B, each node 125 is a distinct node of the wireless network 120 and is independently manageable through use of an identifier that uniquely identifies the node so as to distinguish it from other nodes of the wireless network 120. In an exemplary embodiment, the gateway 115 uses multicast or directed multicast messaging to communicate with nodes across the network 120, such that messages may be sent to multiple nodes from a first transmitting node. In other embodiments, unicast messages and/or other types of communication may be used. A multicast message does not follow a single path defined by routing tables to a destination node, but is instead gradually retransmitted (also referred to as "rebroadcasting" or "forwarding") by nodes that receive the message regardless of the message's destination or destinations. A multicast message is typically retransmitted by each node that receives it, and a node that receives a multicast message usually does not return an acknowledgment to the sender. A multicast message includes a header and a payload portion that includes the intended content data, if any. Nodes 125 process, retransmit, and/or broadcast the message through the network 120 based on the information in the message header, such as the message type. The header of the multicast message typically contains network identifying information, such as network parameters (e.g., network ID) and/or a group identifier. Upon processing a multicast message after receipt, a receiving node will be able to determine whether it is an intended recipient of the message based on those network parameters, and in some embodiments, group identifier(s). More specifically, the node may compare one or more network parameters specified in the message to its own network parameters, such comparison being managed at the network layer of the node. In this disclosure, a multicast message specifying a particular group identifier or control identifier, so as to target an intended set of one or more recipient nodes, may also be referred to as a "directed multicast" message.

The header of a multicast message may include a finite transmission period or a time-to-live (TTL) value, which is decremented every time the message is transmitted/retransmitted (a "hop"). At the point that the TTL value reaches zero or some other set threshold, the message is no longer retransmitted. Using this practice, propagation of the multicast message eventually stops so that a message is not retransmitted in perpetuity. Alternatively, another manner of setting a finite time limit on the transmission period can be implemented.

In an exemplary embodiment, in addition to routine command and/or topological messages over the network, the gateway 115 also sends "hint" messages in its communication with nodes 125. A hint message may be understood as a message for informing a node 125 of a possible asynchronous event and a set of one or more commands that should be taken by the node in response to the occurrence of such an event. An asynchronous event may be understood as an event having a timing that is unpredictable. That is, an asynchronous event is generally an event for which the timing is not scheduled, periodic, or otherwise known in advance to the gateway 115. As an example, an asynchronous event may be a recognition that someone pushed a switch (switch activated), walked into room (occupancy sensor), an environment lighting change (photosensor), an outside act, such as a human-imitated command to turn off lights, an irregular event such as a sunrise time, or any other event not initiated by the gateway. A hint message may, for instance, provide information specifying that when a light switch is activated (pressed/flipped) a lighting controller should turn on a light source to a certain brightness (e.g., 50%). In some embodiments, the action may be designed as a field with a number, e.g., 0 for off, or 100 for on, or something in-between. As another example, a hint message may specify that when a proximity or movement sensor is activated, the lighting controller should turn on a specific neighboring light source. In still another example, a hint may simply inform a node to "do nothing," an action typically used to cancel or clear out a now unneeded or undesired course of action mandated by a previously-sent hint.

The hint message is not limited to a single event/action, but rather, may contain instructions for one or more events (input parameters) that result in a respective one or more proscribed reactions. For instance, where a light switch contains multiple buttons, each directed to a different goal (e.g., on/off, dim, and so on), different or respective actions should be taken in response to the pressing of different buttons. Accordingly, a hint message may contain a series of rules (event/command combinations), and in either a one-to-one (one action per event) or one-to-many (multiple actions per event) combination. In other embodiments, a hint may be many-to-one, where multiple actions may result in a single discrete action being taken. For example, a single, double, or triple press of a light switch may result in different reactions by a single lighting controller. However, in an exemplary embodiment, the instructions contained within the hint should be simplistic in nature to avoid complex calculation or evaluation at the node, in the interest of reducing compute and power consumption at the wireless device.

An exemplary set of additional events and actions is set out in Table 1 below. Of course, this list is exemplary and any appropriate combination of event/action may be used in different embodiments. Note that a "zone," as known in the art, refers to group of lights that are controlled according to a certain control scheme. As an example, a zone could refer to a group of lights in a room that are respectively controlled to have desired brightness in response to a certain user input.

asynchronous event (step 304). In response to this sensing, Node N3 generates messages that identify the relevant zone of nodes (group ID), the source of the message (Node N3), and message type (e.g., switch activated). It then transmits the message through routine multicast protocol to lighting nodes N1 (306-2), N2 (306-1) and N4 (306-3), which

TABLE 1

| EVENT | HINT INSTRUCTION |
|---|---|
| Light switch set to on/off/dim | Do nothing, behavior is driven from the gateway normally |
| Occupancy sensor activated | On motion sensor, set zone(s) to bright level |
| | All other (timed) behavior is driven from the gateway normally |
| Photocell sensor activated | do nothing, timed behavior is driven from the gateway normally |
| Light switch activated | Switch on, set zone(s) to bright level |
| | Switch off, set zone(s) to dim/off level |
| Light switch and occupancy sensor activated | Switch on, set zone(s) to bright level |
| | Switch off, set zone(s) to dim/off level |
| | On motion sensor, set zone(s) to bright level |
| | All other (timed) behavior is driven from the gateway normally |
| Light switch and vacancy sensor activated | Switch on, set zone(s) to bright level |
| | Switch off, set zone(s) to dim/off level |
| | All other (timed) behavior is driven from the gateway normally |
| Photocell sensor and occupancy sensor activated | do nothing, timed behavior is driven from the gateway normally |
| Photocell sensor and light switch activated | On daylight, gateway sets zone(s) to dim/off level and pushes hint to lighting controller, do nothing |
| | On darkness, gateway sets zone(s) to bright level and pushes hint to lighting controller: |
| | Switch on, set zone(s) to bright level |
| | Switch off, set zone(s) to dim/off level |
| Light switch, photocell sensor and occupancy sensor activated | On daylight, gateway sets zone(s) to dim/off level and pushes hint to controller, do nothing |
| | On darkness, gateway sets zone(s) to bright level and pushes hint to controller: |
| | Switch on, set zone(s) to bright level |
| | Switch off, set zone(s) to dim/off level |
| | All other (timed) behavior is driven from the gateway normally |
| Light switch, photocell sensor and vacancy sensor activated | On daylight, gateway sets zone(s) to dim/off level and pushes hint to controller, do nothing |
| | On darkness, gateway sets zone(s) to bright level and pushes hint to controller: |
| | Switch on, set zone(s) to bright level |
| | Switch off, set zone(s) to dim/off level |
| | All other (timed) behavior is driven from the gateway normally |

Figure 3:
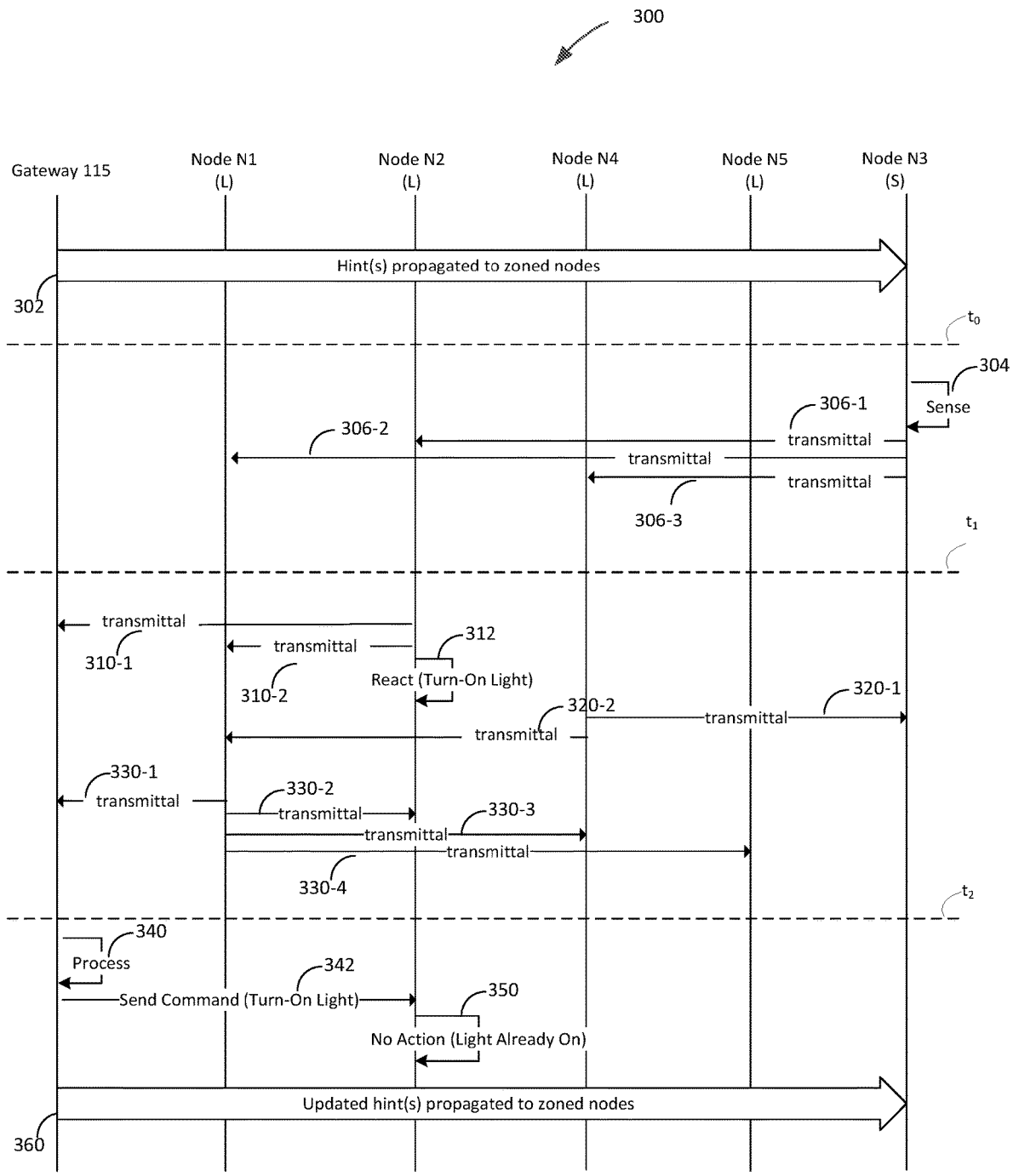
FIG. 3 is a diagram of an exemplary transmission of data between network devices in accordance with some embodiments of the present disclosure.

An exemplary process of distributing and acting upon hint messages is described herein with reference to FIG. 3. The process 300 begins at step 302, where the gateway 115 transmits one or more hints to nodes within a zone. At the beginning of the process, the nodes are assumed not to have received any hint data. In an exemplary embodiment, the hint messages 302 are sent via regular multicast messaging, such that the messages are propagated through the network through transmission and retransmission. The gateway sends a multicast transmission to all nodes in a zone identified by a group ID. A recipient node, upon receiving the message, will either retransmit the message or, it is within the intended group, will process and then retransmit the message.

In an exemplary embodiment, a hint message sent in step 302 does not itself contain code, but rather simply contains one of more instructions in a formatted message parseable by the receiving node's controller. A hint message may contain various fields including a source identifier (sometimes referred to as a "source address") of the sensor node that may recognize the event, a message type for the event, a designated action to be taken by the node, and in some embodiments a schedule for when to take the action. Put simply, the message may contain a <source, type, action, action . . . >tuple or pairing. Typically, where multiple instructions are included, the instructions are appended one after another for all different possible inputs.

In the illustrated embodiment of FIG. 3, at time stamp $t_0$, Node N3, a sensor node, senses the occurrence of an comprising the nodes neighboring Node N3 (FIG. 1B). In this embodiment, the sensor node contains sufficient intelligence (in event logic 246) to recognize the group of nodes to which the multicast message should be sent. This set of instructions (e.g., <event, send to nodes X>) may be transmitted to the sensor node in step 302 as a hint message from gateway 115.

In an alternate embodiment, the sensor node does not send a message with a group identifier, but instead simply sends a multicast message indicating the event through the system, which message would eventually reach and be processed by the gateway 115. In such an embodiment, the multicast message may be recognized (by its source ID) in the event the multicast message is received by the appropriate recipient nodes. In such embodiment, the process of informing the lighting nodes N1, N2, and N4 may be transparent to the sensor node, which simply reports the event that it is has detected and the recipient nodes may react to the reporting message.

Time stamp $t_1$ is illustrated after the first "hop" of transmission. At the time $t_1$, nodes N1, N2, and N4 (lighting nodes) have received the multicast message. It may be assumed in the embodiment of FIG. 3 that nodes N1 and N4 have not received hint instructions to react in regard to the sensed event identified in the message, but that N2 does have stored hint instructions to react to the identified event. Accordingly, while node N1 (in steps 330-1, 330-2, 330-3, and 330-4) and node N4 (in steps 320-1 and 320-2) may simply retransmit the message to their respective neighboring nodes as they would any multicast message, Node N2 acts upon the message in addition to retransmission (steps 310-1 and 310-2).

When the node N2 receives the message from a designed source corresponding to one or more hints in the stored hint data 242, event logic 246 of the node N2 references the stored hint data 242 to identify and implement one or more designated actions. In step 312, node N2 parses the multicast message to pull the source and event data from the header fields. This data is used to reference the stored hint data which is stored as one or more records in the stored hint data repository 242 of memory 240. The actions stored in association with the identified event are executed by node N2 (here, turn on light).

By time stamp $t_2$, the gateway 115 has received the multicast message from node N3, processes the event message in a routine manner (step 340) and then sends a command to the appropriate lighting node 125 to take action, here Node N2 (step 342). In step 350, node N2 receives the command, but having already acted upon it, ignores it (or in some embodiments takes a redundant action). As can be seen, while Node N2 receives a command from the gateway 115 at time $t_2$ (step 342), it has already reacted to the event by turning on the light at time $t_1$ (step 312). That is, by virtue of the process 300 using asynchronous messages, a faster reaction time to events can be achieved relative to an embodiment where Node N2 takes the action only in response to a command from the gateway 115.

In some embodiments, gateway 115 may then update the hints to either Node N2 or any of all of the nodes N1-N5, if needed or desired (step 360). For example, where the first hint 302 may have instructed N2 to turn on a light source in the case of a button push sense by node N3 (304), the updated hint may instruct N2 to turn off this same light source upon an occurrence of the same asynchronous event.

If multiple instances of the asynchronous event 304 occur before an updated hint 360 is sent (e.g., multiple repeated button pushes), the reactive node N2 may repeatedly perform the same reaction instructed in stored hint data 242. While redundant, the simplicity of the instruction reduces the amount of compute or complex thought expended by the node N2.

Figure 4:
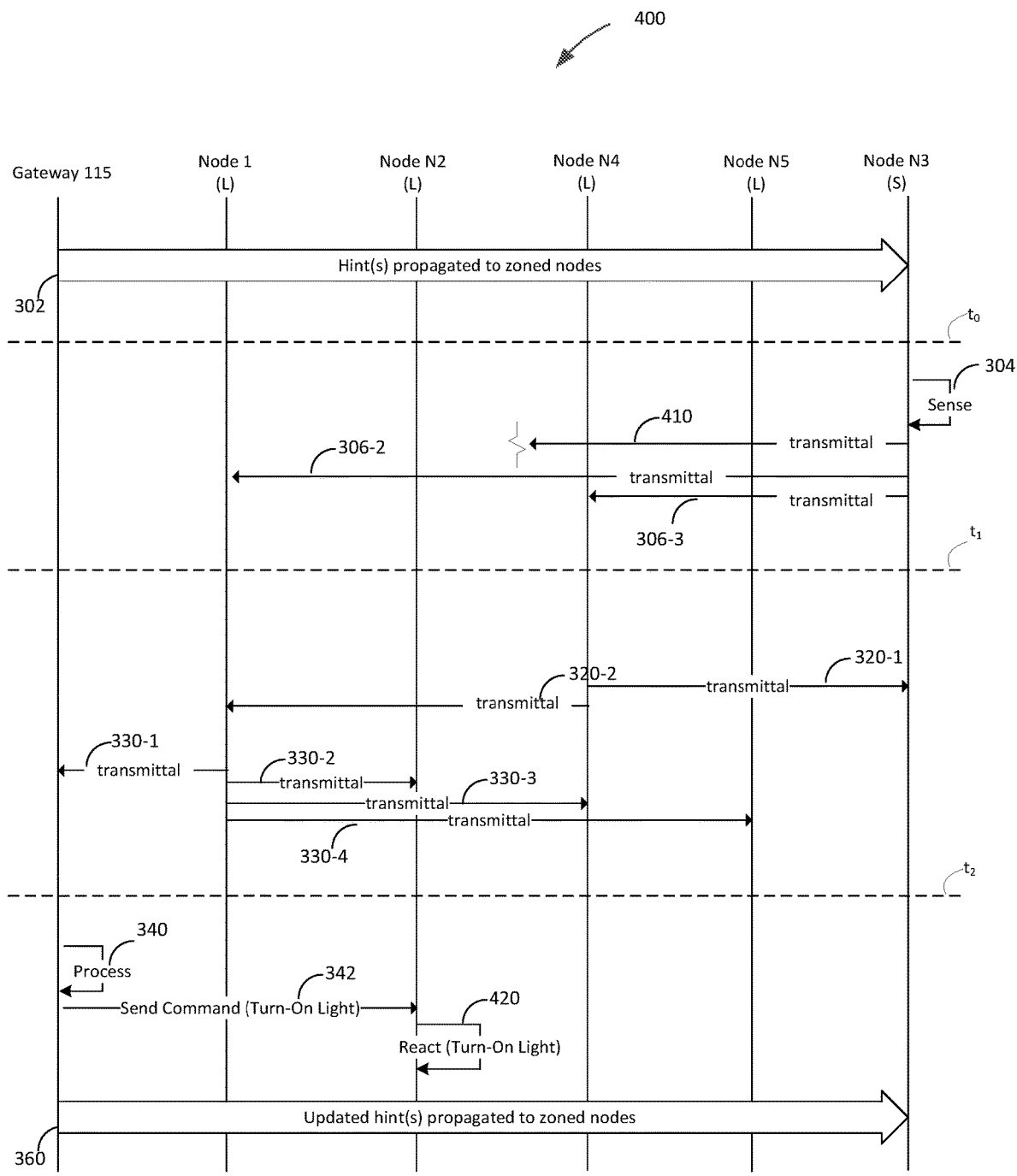
FIG. 4 is a diagram of an exemplary transmission of data between network devices in accordance with some embodiments of the present disclosure.

It may be generally understood that communication of the hint messages 302 and 360 need not be robust, as the system performance does not rely on these messages for correct operation of the system. That is, even if a lighting controller does not receive the most recent hint message, the gateway 115 will ensure that the lights in the system are transitioned to the appropriate states, although a greater lag may be experienced. To this point, FIG. 4 illustrates a process 400 largely similar to that of process 300 (FIG. 3). A first discrepancy may be noted at step 410, in which the multicast transmission by node N3 fails to reach node N2. Accordingly, N2 does not act in response to the asynchronous event, even though it has stored hint instructions to do so. In such an embodiment, the instruction 342 sent from the gateway 115 at time $t_2$ will function to trigger a reaction in node N2 (step 420), here, turning on the light. Accordingly, even where the instructions from the hint message 302 are missed or not implemented, redundant procedures exist to effect the reaction by the appropriate node.

Note that various embodiments described herein leverage multicast messaging in order to reduce the lag between an occurrence of an event (e.g., a button press) at one node and a responsive action (e.g., change in state of a light source) at another node. In this regard, as described above, the system 100 may be designed such that each sensed event is reported by multicast messaging to the gateway 115, which then determines which actions to take in response to the events and transmits commands to the nodes as appropriate for performing the actions.

For example, as described above, if node N3 senses a particular event, the node N3 transmits a multicast message that is indicative of the sensed event, and this multicast message, referred to hereafter as the "Event Message," is eventually received by the gateway 115 as the Event Message propagates through the network 120. In response, the gateway 115 may transmit a command, referred to hereafter as the "Response Command," to the node N2 instructing the node N2 to perform a specific action such as turning on a light source connected to the node N2. The total time required from the event (e.g., a button press) to the responsive action (e.g., light source activation) may be X, which may be increased as a result of various factors, such as hop distance between the gateway 115 and nodes N2 and N3, network congestion, and processing burdens of the gateway 115.

However, assume that prior to the occurrence of the event, the gateway 115 sends a hint message to the node N2 providing the node N2 with certain information enabling it to identify the Event Message as a message to be processed, such as the identifier of the node N3. In this regard, the node N2 may determine to further process the Event Message in response to a determination that the identifier of node N3 in the hint message matches the source identifier of the Event Message. The hint message may also indicate what action to take (e.g., activation of a light source) if the Event Message indicates that a certain event has occurred (e.g., a certain button press). As an example, the hint message may include an event identifier that is expected in the Event Message, where such event identifier indicates that certain type of event (e.g., button press) has been sensed. The node N2 may determine to perform the action indicated by the hint message in response to a determination that the event identifier in the hint message matches the event identifier of the Event Message. Thus, the node N2 is configured to determine when to take the action indicated by the hint message based on comparisons of the information in the multicast message to the information in the hint message.

In the current example, the Event Message as it is propagating through the network 120 from node N3 may be received by Node N2 before such node N2 receives the Response Command from the gateway 115. In such case, in response to the Event Message and based on comparisons of the hint information previously provided by the gateway 115 to the multicast message, the node N2 may take the same action that is later commanded by the Response Command (e.g., activation of a light source) before the Response Command is even received by the node N2. In fact, depending on the respective timing of the Event Message and the Response Command, it is possible for the node N2 to take such action before the Event Message is even received by the gateway 115. Thus, the total time from occurrence of the event (e.g., a button press) to the responsive action (e.g., light source activation) may be Y, where Y is significantly less than X.

In foregoing example, multicast messaging is leveraged to reduce network lag. That is, using the recognition that the Event Message will likely be received by a large number of nodes, possibly including node N2, the gateway 115 is configured to provide the node N2 with sufficient information to recognize the Event Message as a message to process.

The gateway 115 may also indicate what action to then perform in response to the Event Message if the Event Message indicates that a certain type of action has occurred. Thus, before occurrence of the event, the gateway 115 provides the node N2 with sufficient information to recognize the Event Message and to respond to the Event Message in the appropriate manner. However, the gateway 115 does not rely on reception of the Event Message by the node N2 to ensure that the responsive action is performed. That is, upon receiving the Event Message originally transmitted by node N3, the gateway 115 still commands the node N2 to take the responsive action. Thus, the responsive action is taken regardless of whether the Event Message is received or acted on by node N2. Moreover, the robustness of the network 120 is not compromised by allowing distributed control to occur in order to reduce lag in instances when a given node is able to recognize an event message from a sensor node and take the appropriate action in response to the event message. In such a case, the responsive node does not wait on a command from the gateway to take the responsive action but instead proceeds with performing the responsive action before receiving such command thereby shortening the delay between occurrence of an event and performance of the responsive action.

Note that it is unnecessary for the hint information to be provided by the same device that also transmits the Response Command. As an example, it is possible for a device separate from the gateway 115 to provide hint information such that the hinting process is completely transparent to the gateway 115, which is configured to process events and issue commands irrespective of whether the nodes are able to take actions based on the hint information.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) may be made to further optimize the provided structures, devices and methods, as shown and described herein. In any event, the structures and devices, as well as the associated methods, described herein have many applications. Therefore, the disclosed subject matter should not be limited to any single embodiment described herein, but rather should be construed in breadth and scope in accordance with the appended claims.

Now, therefore, the following is claimed:

1. A system, comprising:
   a wireless network having at least a first node coupled to a sensor and a second node coupled to a device, the first node configured to transmit a multicast message indicative of an occurrence of an event sensed by the sensor; and
   a network management device configured to receive the multicast message and determine, based on the multicast message, an action to be taken by the second node for controlling the device in response to the event, the network management device configured to transmit to the second node a command for commanding the second node to take the action,
   wherein the second node is configured to receive, prior to the occurrence of the event, data indicative of the action to take in response to the event, and wherein the second node is configured to receive the multicast message and to perform the action in response to the multicast message based on the data before receiving the command from the network management device.

2. The system of claim 1, wherein the network management device is configured to transmit the data to the second node prior the occurrence of the event.

3. The system of claim 1, wherein the data includes an identifier of the first node.

4. The system of claim 3, wherein the second node is configured to compare the identifier of the first node to a source identifier of the multicast message and to perform the action in response to the multicast message based on a comparison of the identifier of the first node to the source identifier of the multicast message.

5. The system of claim 1, wherein the data includes an event identifier identifying the event.

6. The system of claim 5, wherein the second node is configured to compare the event identifier of the data to an event identifier of the multicast message and to perform the action in response to the multicast message based on a comparison of the event identifier of the data to the event identifier of the multicast message.

7. A method for use in a wireless network having a plurality of nodes including at least a first node and a second node, comprising:
   receiving, at the second node, a multicast message transmitted from the first node, wherein the multicast message indicates an occurrence of an event sensed by a sensor associated with the first node;
   retransmitting the multicast message by the second node;
   receiving the multicast message at a network management device;
   determining, by the network management device in response to the multicast message and based on the event indicated by the multicast message, an action to be taken by the second node for controlling a device coupled to the second node;
   transmitting, from the network management device to the second node, a command for commanding the second node to perform the action in response to the determining;
   receiving the command at the second node;
   receiving, at the second node prior to the occurrence of the event, data indicative of the action to take in response to the event; and
   performing the action by the second node in response to the multicast message based on the data prior to the receiving the command at the second node.

8. The method of claim 7, further comprising transmitting the data from the network management device to the second node prior the occurrence of the event.

9. The method of claim 7, wherein the data includes an identifier of the first node.

10. The method of claim 9, further comprising comparing, at the second node, the identifier of the first node to a source identifier of the multicast message, wherein the performing is based on the comparing.

11. The method of claim 7, wherein the data includes an event identifier identifying the event.

12. The method of claim 11, further comprising comparing, at the second node, the event identifier of the data to an event identifier of the multicast message, wherein the performing is based on the comparing.

\* \* \* \* \*